US008486356B2

(12) United States Patent
Attalla et al.

(10) Patent No.: US 8,486,356 B2
(45) Date of Patent: Jul. 16, 2013

(54) ALKANOLAMINES FOR $CO_2$ REMOVAL FROM GAS STREAMS

(75) Inventors: Moetaz Ibrahim Attalla, Warners Bay (AU); Graeme Douglas Puxty, Tighes Hill (AU); Andrew Wayne Allport, Mount Hutton (AU); Mark Bown, Notting Hill (AU); Qi Yang, Wheelers Hill (AU); Robert Cameron Rowland, Stockton (AU)

(73) Assignee: Commonwealth Scientific and Industrial Research Organisation, Campbell, Australian Capital Territory (AU)

( * ) Notice: Subject to any disclaimer, the term of this patent is extended or adjusted under 35 U.S.C. 154(b) by 146 days.

(21) Appl. No.: 12/936,044

(22) PCT Filed: Apr. 1, 2009

(86) PCT No.: PCT/AU2009/000398
§ 371 (c)(1),
(2), (4) Date: Dec. 17, 2010

(87) PCT Pub. No.: WO2009/121135
PCT Pub. Date: Oct. 8, 2009

(65) Prior Publication Data
US 2011/0116997 A1    May 19, 2011

(30) Foreign Application Priority Data

Apr. 1, 2008   (AU) .................................. 2008901559

(51) Int. Cl.
*B01D 53/62*    (2006.01)

(52) U.S. Cl.
USPC ........................................... 423/228; 423/220

(58) Field of Classification Search
USPC .................................................. 423/220, 228
See application file for complete search history.

(56) References Cited

U.S. PATENT DOCUMENTS

| 4,240,922 | A | 12/1980 | Sartori et al. |
| 6,500,397 | B1 | 12/2002 | Yoshida et al. |
| 2008/0050296 | A1 | 2/2008 | Tontiwachwuthikul et al. |
| 2008/0159937 | A1 | 7/2008 | Ouimet |

FOREIGN PATENT DOCUMENTS
EP    1 813 343 A1    8/2007

OTHER PUBLICATIONS

ChemicalBook.com, "3-Piperidinemethanol." Chemical Book, 2010 (no. month). Viewed on Aug. 23, 2012 at http://www.chemicalbook.com/ChemicalProductProperty_EN_CB7145353.htm.*
European Search Report for EP 09727981; Jul. 13, 2011.
International Search Report of PCT/AU2009/000398 dated May 1, 2009.

* cited by examiner

*Primary Examiner* — Daniel C McCracken
*Assistant Examiner* — Daniel Berns
(74) *Attorney, Agent, or Firm* — Sughrue Mion, PLLC

(57) ABSTRACT

A process for the capture of $CO_2$ from gas streams comprising contacting a $CO_2$ containing gas stream with an aqueous alkanolamine solution, wherein the alkanolamine is selected from the group consisting of: 3-piperidinemethanol, Tricine, 3-quinuclidinol, 3-piperidino-1,2-propanediol and their salts.

5 Claims, 5 Drawing Sheets

ALKANOLAMINES FOR CO₂ REMOVAL FROM GAS STREAMS

FIELD OF THE INVENTION

This invention relates to aqueous alkanolamine solutions for the purpose of capturing carbon dioxide from gas streams. The alkanolamines exhibit greater than predicted $CO_2$ absorption capacity based upon their $pK_a$ whilst also possessing desirable performance in both their rate of $CO_2$ capture and their $CO_2$ absorption capacity.

BACKGROUND OF THE INVENTION

There is growing pressure for stationary producers of greenhouse gases to dramatically reduce their atmospheric emissions. Of particular concern is the emission of carbon dioxide ($CO_2$) into the atmosphere. One method of reducing atmospheric $CO_2$ emissions is through its capture and subsequent storage in geological or deep sea reservoirs.

The process for capturing $CO_2$ from power station or combustion device flue gases is termed post combustion capture. In post combustion capture, the $CO_2$ in flue gas is first separated from nitrogen and residual oxygen using a suitable solvent in an absorber. The $CO_2$ is then removed from the solvent in a process called stripping (or regeneration), thus allowing the solvent to be reused. The stripped $CO_2$ is then liquefied by compression and cooling, with appropriate drying steps to prevent hydrate formation. Post combustion capture in this form is applicable to a variety of stationary $CO_2$ sources including power stations, steel plants, cement kilns, calciners and smelters.

Aqueous alkanolamine solutions have been investigated as solvents in post combustion $CO_2$ capture. The capture process involves a series of chemical reactions that take place between water, the alkanolamine and carbon dioxide. Alkanolamines are weak bases, and may undergo acid-base reactions. Once dissolved into the alkanolamine solution, the aqueous $CO_2$ reacts with water and the neutral form of the alkanolamine react to generate carbonic acid ($H_2CO_3$), aqueous bicarbonate ($HCO_3^-$) ions and aqueous carbonate ($CO_3^{2-}$) ions, according to the generally acknowledged equations described below:

 (equation 1)

 (equation 2)

 (equation 3)

 (equation 4)

 (equation 5)

 (equation 6)

If the alkanolamine contains a primary ($R_1R_2NH$, $R_2$=H) or secondary amine ($R_1R_2NH$, $R_2{\neq}H$), an additional reaction pathway becomes available, where carbon dioxide and the primary or secondary alkanolamine react to generate a carbamate ($R_1R_2NCOO^-$). The carbamate may also then participate in acid-base chemistry, according to the generally acknowledged reactions described below. Tertiary alkanolamines ($R_1R_2R_3N$, $R_1$, $R_2$, $R_3{\neq}H$) cannot form carbamates.

 (equation 7)

 (equation 8)

It is generally acknowledged that the molar absorption capacity of an aqueous alkanolamine solution, as measured by the number of moles of $CO_2$ absorbed per mole of amine functionality in solution, is dependent upon the pH equilibria that operate in the alkanolamine solution. $CO_2$ absorption capacity decreases as the pH of the solution decreases. Furthermore, whilst the interrelationship of aqueous equilibria that operate as $CO_2$ is absorbed into an alkanolamine solution is complex, it is generally accepted that the pH equilibria operating in aqueous alkanolamine solutions are to a large degree dependent upon the $pK_a$ of the alkanolamine amine functionality, and the tendency for the alkanolamine to form a carbamate. As the $pK_a$ of the alkanolamine amine increases, its aqueous solution becomes relatively more basic, resulting in a greater overall $CO_2$ absorption capacity.

In contrast, carbamate formation by primary and secondary alkanolamines limits the molar $CO_2$ absorption capacity of aqueous alkanolamine solutions. Low molar absorption capacities arise because carbamate formation consumes two moles of amine functionality for every mole of $CO_2$. One mole is required to react with carbon dioxide to generate the carbamate and one mole must then act as a base to capture the proton released from the carboxylic acid functionality of the generated carbamate. This limits the molar absorption capacity $n_{CO2}/n_{amine}$ to a value of 0.5. Low molar absorption capacities are problematic for the application of aqueous alkanolamine solutions to industrial $CO_2$ capture because they require more material to absorb the requisite amount of $CO_2$, higher solvent flow rates and greater energy requirements for desorption. Monoethanolamine (MEA, $HO-CH_2-CH_2-NH_2$), which is currently employed in industrial $CO_2$ capture, possesses an undesirable molar absorption capacity of approximately 0.5.

In summary, there exists a limiting relationship between the molar absorption capacity, whether the amine functionality is primary, secondary or tertiary, and the amine $pK_a$.

Amines used for industrial $CO_2$ capture that achieve a larger $CO_2$ absorption capacity than MEA have poor rates of $CO_2$ absorption. Slow $CO_2$ absorption rates are undesirable because to achieve the requisite absorption of $CO_2$ longer gas-liquid contact times are required which means larger absorption columns and greater capital cost. The benefits gained through increased capacity are thus offset by the disadvantages associated with decreased rates.

There thus exists a need to identify alkanolamines whose aqueous solutions possess improved properties for application in $CO_2$ capture technologies.

SUMMARY OF INVENTION

The present invention seeks to overcome at least one of the problems described above.

The present invention provides a process for the capture of $CO_2$ from gas streams comprising contacting a $CO_2$ containing gas stream with an aqueous alkanolamine solution, wherein the solution contains an alkanolamine selected from the group consisting of: 3-piperidinemethanol; N-[Tris(hydroxymethyl)methyl]glycine (Tricine); 3-quinuclidinol; 3-piperidino-1,2-propanediol, and their salts.

During the course of the inventor's investigations to relate the molar absorption capacity and initial absorption rate to alkanolamine structure and $pK_a$, the absorption capacity and initial absorption rate of a large number of amines was measured. To the inventor's surprise, the alkanolamines described above exhibited absorption capacities exceeding that which would be predicted based on their $pK_a$ and the accepted reactions that occur between $CO_2$ and amines. The alkanolamines also displayed improved absorption capacities whilst not suffering a concomitant unacceptable decrease in initial absorption rate.

It can be seen that the alkanolamines in accordance with the present invention have absorption properties which make them particularly suited to carbon dioxide removal from gas streams. These properties are contrary to absorption properties which the person of ordinary skill in the art would normally have expected from these alkanolamines. Moreover, the alkanolamines also possess desirable performance in their molar absorption capacity whilst not demonstrating a loss of absorption rate that is typical of alkanolamines with improved absorption capacities. This unexpected combination of properties is extremely desirable from an industrial perspective because it allows for a dramatic reduction in liquid flow rates and desorption energy requirements without increasing the size of capital equipment. Moreover, the alkanolamines identified by the inventors are expected to be suitable for industrial application, as the amines according to the present invention are either heterocyclic compounds or amino acids. As such, they are likely to be more resistant to oxidative and thermal degradation in a $CO_2$ capture application.

According to one aspect of the invention, the alkanolamine is 3-piperidinemethanol.

In another aspect, the alkanolamine is N-[Tris(hydroxymethyl)methyl]glycine (Tricine).

In another aspect, the alkanolamine is 3-quinuclidinol.

In another aspect, the alkanolamine is 3-piperidino-1,2-propanediol.

Aqueous solutions of the alkanolamines described above possess a molar absorption capacity greater than the predicted molar absorption capacity according to the generally acknowledged relationship between amine $pK_a$ and molar absorption capacity, and also possesses a molar absorption capacity, $n_{CO2}/N_{amine}$, that is equal to or exceeds a value of 0.7, whilst also demonstrating an acceptable initial $CO_2$ absorption rate.

When the alkanolamine contains a primary or secondary amine, an acceptable absorption rate is defined as an initial absorption rate equal to, or exceeding a value of $7\times10^{-5}$ $s^{-1}$.

When the alkanolamine contains a tertiary amine, an acceptable absorption rate is defined as an initial absorption rate equal to, or exceeding a value of $2.5\times10^{-5}$ $s^{-1}$. Further objects, features and advantages of the invention will become apparent from the following description of the preferred embodiment and accompanying figures and examples.

DETAILED DESCRIPTION OF THE INVENTION

Figure 1:
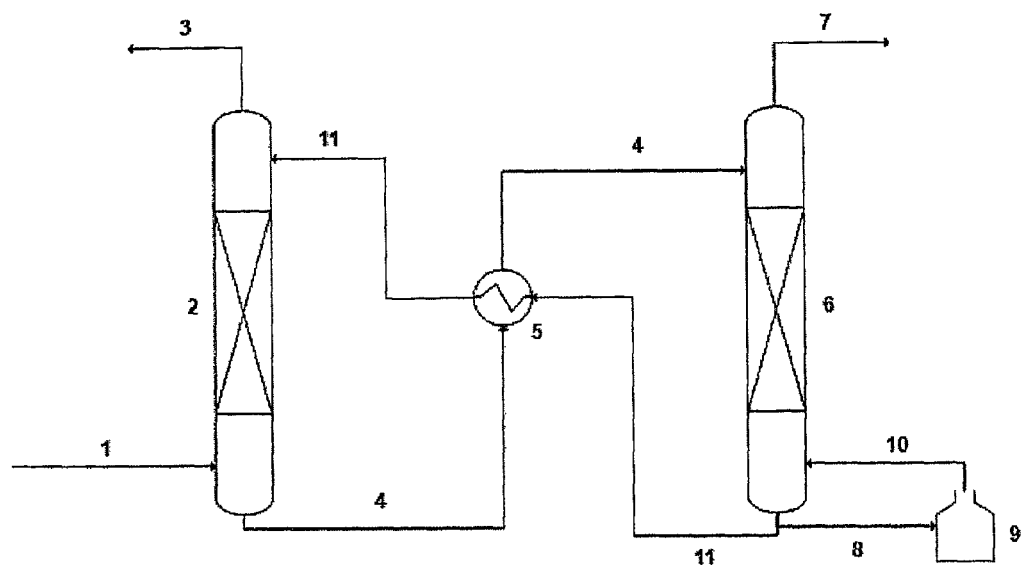
FIG. 1 shows a flow-diagram example of $CO_2$ capture apparatus that may be employed in the process of one embodiment of the current invention.

During the course of the inventor's investigations to relate the molar absorption capacity and initial absorption rate to alkanolamine structure and $pK_a$, the absorption capacity and initial absorption rate of a large number of amines was measured. To the inventor's surprise, several alkanolamines exhibited absorption capacities exceeding that which would be predicted based on their $pK_a$ and the accepted reactions that occur between $CO_2$ and amines.

It can be seen that the use of alkanolamines in accordance with the invention surprisingly have properties which make them suitable for carbon dioxide removal from gas streams. These properties are contrary to absorption properties which the person of ordinary skill in the art would normally have expected from these alkanolamines.

The process according to the following invention provides a process for $CO_2$ capture using aqueous alkanolamine solutions. The alkanolamines selected in accordance with the invention display a molar absorption capacity greater than the predicted molar absorption capacity according to the generally acknowledged relationship between amine $pK_a$ and molar absorption capacity.

They also display improved absorption capacities whilst not suffering a concomitant unacceptable decrease in initial absorption rate.

The invention provides a process for the capture of $CO_2$ from gas streams comprising contacting a $CO_2$ containing gas stream with an aqueous alkanolamine solution, wherein the solution contains an alkanolamine selected from the group consisting of: 3-piperidinemethanol; N-[Tris(hydroxymethyl)methyl]glycine (Tricine); 3-quinuclidinol; 3-piperidino-1,2-propanediol, and their salts.

In one embodiment, the alkanolamine is 3-piperidinemethanol.

In another embodiment, the alkanolamine is N-[Tris(hydroxymethyl)methyl]glycine (Tricine).

In another embodiment, the alkanolamine is 3-quinuclidinol.

In another embodiment, the alkanolamine is 3-piperidino-1,2-propanediol.

Of the alkanolamines described above, 3-piperidinemethanol is a preferred embodiment.

As used herein, an "aqueous alkanolamine solution" is intended to refer to a solution that includes an alkanolamine and water. The definition is not intended to exclude the inclusion of other solvents (for example alcohols) or other additives (for example corrosion and oxidation inhibitors). Typically, the solution may contain from 90 to about 50% (w/w) water.

The alkanolamine compounds are known and are available in commercial quantities from several chemical suppliers, including, for example, Sigma-Aldrich Pty. Ltd.

It will be understood that, owing to the basicity of the amine functionality present in all of the alkanolamines, these compounds may exist in their protonated forms as salts. For example, the alkanolamines according to the current invention may be available or present as their hydrochloride or hydrobromide salts. Furthermore, it will be understood that, owing to the presence of acidic groups within the structure of tricine, this compound may exist as a salt. Typically, tricine will be available as a sodium, potassium or lithium salt, however these examples of counterions are not intended to be limiting. The use of salt forms of the alkanolamines according to the present invention for the capture of $CO_2$ from gas streams is intended to be included within the scope of the current invention.

There is a generally acknowledged qualitative relationship between the $pK_a$ of the amine functionality of an alkanolamine and the $CO_2$ absorption capacity of its aqueous solutions. In one embodiment, the alkanolamines of the current invention display a molar absorption capacity greater than the predicted molar absorption capacity according to the generally acknowledged relationship between amine $pK_a$ and molar absorption capacity.

Theoretical methods have also been developed that allow a quantitative relationship between molar absorption capacity and $pK_a$ for aqueous alkanolamine solutions to be predicted. See, for example, McCann, N.; Maeder, M.; Attalla, M.; *Simulation of Enthalpy and Capacity of $CO_2$ Absorption by Aqueous Amine Systems* Ind. Eng. Chem. Res.; 47, 2008; 2002-2009. In another embodiment, the alkanolamines of the current invention display a molar absorption capacity greater than the predicted molar absorption capacity according to an accepted theoretical relationship between amine $pK_a$ and molar absorption capacity.

Theoretical calculations of $CO_2$ absorption capacity as a function of amine $pK_a$ are determined by calculating the speciation of the chemical equilibria defined by equations 1 to 8. Speciation can be determined by using known values of the chemical equilibrium constants for equations 1 through 8, where an equilibrium constant K is defined according to equation 9.

$$aA + bB \leftrightarrow cC + dD \quad K = [C]^c \times [D]^d / [A]^a \times [B]^b \quad \text{(equation 9)}$$

The equilibrium constants can be arranged into a system of nonlinear simultaneous equations. Given a $CO_2$ partial pressure and amine concentration, these equation can be solved for the concentration of each chemical species using root finding methods such as the Newton-Raphson method. Once the concentrations have been obtained, the $CO_2$ absorption capacity can be easily determined. For amines where the values of some equilibrium constants are unknown, their values can be varied over a realistic range to determine the $CO_2$ absorption capacity limits at a particular $pK_a$.

The alkanolamines described herein also demonstrate acceptable rates of initial $CO_2$ absorption. For alkanolamines that contain a primary or secondary amine, the above described alkanolamines demonstrate an initial absorption rate that is equal to, or exceeds a value of $7 \times 10^{-5}$ $s^{-1}$; preferably is equal to, or exceeds $1.13 \times 10^{-4}$ $s^{-1}$; and most preferably is equal to, or exceeds $2.26 \times 10^{-4}$ $s^{-1}$. For alkanolamines that contain a tertiary amine, the above described alkanolamines demonstrate an initial absorption rate that is equal to, or exceeds a value of $2.5 \times 10^{-5}$ $s^{-1}$; preferably is equal to, or exceeds $1.13 \times 10^{-4}$ $s^{-1}$; and most preferably is equal to, or exceeds $2.26 \times 10^{-4}$ $s^{-1}$.

A person of ordinary skill in the art would readily be able to determine the initial rate of $CO_2$ absorption of the above described alkanolamine solutions using methods described in various publications, such as, for example, S. Ma'mum, H. F. Svendsen, K. A. Hoff and O. Juliusson, *Selection of new absorbents for carbon dioxide capture*, Energ. Conyers. Manage., 48, 2007, 251-258.

Selection based upon preferred embodiments of rate versus capacity would readily be made by a person skilled in the art, and will depend upon the particular conditions under which the process according to this invention will be applied.

At least one of the above defined alkanolamines is present in the aqueous solution of the present invention in an amount effective to remove $CO_2$ from a gas stream.

When the one of the above defined alkanolamines is used according to the following invention, it is typically present in an amount from approximately 5-30, preferably from about 10-30, more preferably from about 20-30, percent by weight based upon the total weight of the aqueous solution.

The optimal amount of the alkanolamines according to the present invention will depend upon the gas stream composition, outlet fluid requirement, and circulation rate. A person of ordinary skill in the art would readily determine the amount of the alkanolamine selected from the above defined alkanolamines.

The process of the present invention can be carried out in any conventional equipment for the removal of carbon dioxide from gas streams by reactive chemical absorption and detailed procedures are well known to a person of ordinary skill in the art. See, for example, the flow-diagram of FIG. 1 or, S. A. Newman, *Acid and Sour Gas Treating Processes*, Gulf Publishing Company, Texas, 1995.

In the embodiment described by FIG. 1, the equipment comprises an absorber column 2, a heat exchanger 5, a desorber column 6 and a reboiler 9. Flue gas, which typically comprises 1-15% $CO_2$, preferably 5-15% $CO_2$ and more preferably 10-15% $CO_2$, is optionally passed through a prescrubber and then passes through conduit 1 to the packed absorber column 2, where it is contacted with the aqueous alkanolamine solution of the present invention. Pressure and temperature conditions in the absorber column 2 are typically 1 atm and about 40 to 60 degrees celcius. $CO_2$-lean flue gas is released from the top of the absorber via conduit 3. The $CO_2$-rich alkanolamine solution is conducted through a pipe 4 to a desorber column 6 via a heat exchanger 5. In the desorber column 6, the $CO_2$-rich alkanolamine solution is heated to reverse the absorption reaction. Typical pressure and temperature conditions in the desorber are 1-2 atm and 100 to 150 degrees celcius. $CO_2$ and moisture is collected from the top of the desorber column via conduit 7. The desorber column is heated by means of a reboiler 9, connected to the desorber by conduits 8 and 10. The heat source of the reboiler is preferably low pressure steam at a temperature of 105-135° C. The $CO_2$-lean alkanolamine solution is then conducted through a pipe 11 to the absorber 2 via the heat exchanger 5. In the heat exchanger 5, sensible heat from the lean alkanolamine solution is used to heat the $CO_2$-rich solution from the absorber.

The process according to the present invention can be conveniently carried out in any suitable absorber. The great number of absorbers used for gas purification operations include packed, plate or spray towers. These absorbers are interchangeable to a considerable extent although certain specific conditions may favour one over the other. In addition to conventional packed, plate or spray towers, specialised absorber towers have been developed to meet specific process requirements. Examples of these specific towers include impingement-plate scrubbers and turbulent contact scrubbers.

The process of the present invention can be carried out in either packed, plate or spray towers, or specialised towers developed to meet specific process requirements, and can contain other peripheral equipment as necessary for optimal process operation. Such peripheral equipment may include but is not limited to an inlet gas separator, a treated gas coalescor, a solvent flash tank, a particulate filter and a carbon bed purifier. The inlet gas flow rate varies according to the size of the equipment but is typically between 5 000 and 25 000 cubic meters per second. The solvent circulation rate is typically between 10 and 40 cubic meters per tonne of $CO_2$. The operating pressure of the absorber is typically 1 atm.

In the process of the present invention, a gas stream containing carbon dioxide at or above atmospheric pressure is contacted with an aqueous solvent system, containing any of the above defined alkanolamines at a temperature at or above ambient temperature, preferably between 30° C.-60° C., and more preferably between 35° C.-45° C. to effect absorption of $CO_2$ from the gas stream. Optionally, corrosion inhibitors, scale inhibitors, antifoam agents and other additives known to those in the art that may assist in the $CO_2$ capture process of the present invention may be employed.

The following examples are offered to illustrate but not to limit the present invention.

EXAMPLE 1 AND COMPARATIVE EXAMPLE C-1

A mixture of 13% $CO_2$ (99.5% purity, BOC Australia) and 87% $N_2$ (>99.99% purity, BOC Australia) was delivered using mass-flow controllers (Bronkhurst High-Tech El-Flow). The gas was passed through a mixing chamber, humidified and then sparged via a sintered glass frit through a 30% w/w amine solution in a glass reactor vessel at ambient pressure. Gas flow rates and solution volumes of 1.7 L min$^{-1}$ and 300 mL or 1.0 L min$^{-1}$ and 20 mL respectively were used depending on the quantity of amine available. The $CO_2$ content of the gas outflow was measured using a Horiba VS-3001 general purpose gas sampling unit and Horiba VA-3000 NDIR multi-gas analyser. The difference between the inflow and outflow $CO_2$ concentration was used to determine the amount of $CO_2$ absorbed. The humidifier and amine solution were thermostated to 40° C. by immersion in a temperature controlled water bath (Techne).

The experiments were run by initially allowing the humidifier and reactor containing the amine solution to thermally equilibrate. During this period the system was flushed with $N_2$ and calibration of the $CO_2$ analyser was completed. The appropriate gas mix was first established with the gas flow passing through the saturator but bypassing the reactor and passing directly to the $CO_2$ analyser. The gas flow was then switched to pass through the reactor to begin the experiment. Each experiment was run until the measured $CO_2$ concentration in the outflow returned to the original value.

Figure 2:
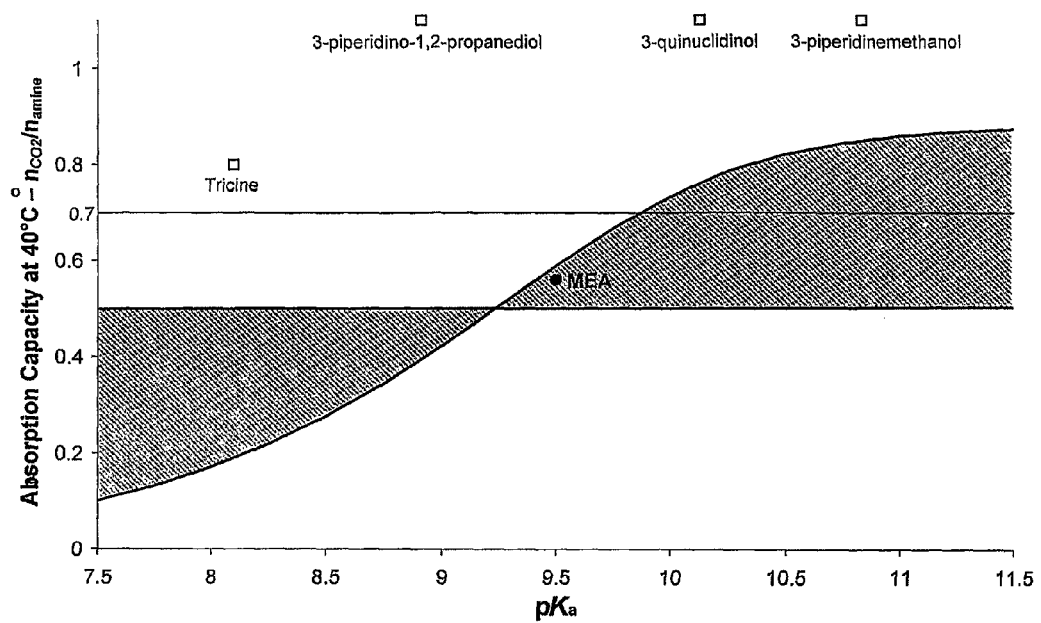
FIG. 2 shows the experimentally measured $CO_2$ absorption capacity versus $pK_a$ for the specified amines and MEA.

Data is presented in FIG. 2. The hashed area on the figure is where the capacity would be predicted to fall based on the accepted aqueous phase reactions and the amine $pK_a$. The hashed area was determined using the theoretical method previously described to calculate $CO_2$ absorption as a function of amine $pK_a$. To generate this area the equilibrium constant for carbamate formation, as given in equation 7, was varied between a large value such that carbamate formation was exclusively favoured, and a small value such that carbamate formation did not occur. This then provides the limits of where the $CO_2$ absorption capacity would lie for a given $pK_a$.

This data demonstrates that the example alkanolamines all exhibit a molar absorption capacity, $n_{CO_2}/n_{amine}$, exceeding a value of 0.7. Furthermore, all alkanolamines demonstrate absorption capacities that exceed that based upon their $pK_a$. In contrast, the absorption capacity of MEA falls below a value of 0.7 and also falls within the range of values predicted based upon amine $pK_a$.

EXAMPLE 2

A Setaram TG-DTA/DSC thermal gravimetric analyser (Setaram) was used in isothermal mode at 40° C. to monitor the increase in mass of an aqueous amine solution when exposed to an atmosphere of 15% $CO_2$ and 85% $N_2$ by volume at ambient pressure. This $CO_2$ concentration was chosen as it closely represents that of a coal fired power station flue gas. Two separate isothermal gravimetric analysis (IGA) experiments were performed in order to determine the total $CO_2$ uptake of the amine test solution. The first experimental run determined the mass loss due to evaporation and the second determined the mass increase of the test solution when exposed to $CO_2$ over the same length of time. Each experiment was performed on a fresh 100 μL aliquot of the test solution in a 100 μL alumina crucible (Setaram). The test solutions were made to an amine concentration of 30% w/w in deionised water, unless solubility constraints did not allow this. All chemicals were purchased from Sigma-Aldrich and used without further purification. The purity of all the amines used was in the range 95-99.5% with the highest purity available always chosen.

The IGA instrument was setup with two gas stream inputs, one providing a beta mix of 15% $CO_2$ and 85% $N_2$ (99.9% purity, BOC Australia) and the other $N_2$ (>99.99% purity, BOC Australia). Both flows were controlled using mass flow controllers (Bronkhurst High-Tech El-Flow) with a total gas flow of 30 mL min$^{-1}$ used for all experiments. For calculations of absorption capacities the mass at time t from the evaporation run is subtracted from the mass at time t of the absorption run. An absorption curve can then be plotted by converting this data to moles of $CO_2$ per mole of amine in solution versus time. The $CO_2$ absorption capacity is then determined as the maximum point on the absorption curve.

The initial absorption rate was calculated as the slope of the initial linear region of the measured $CO_2$ absorption capacity versus time curve.

Figure 3:
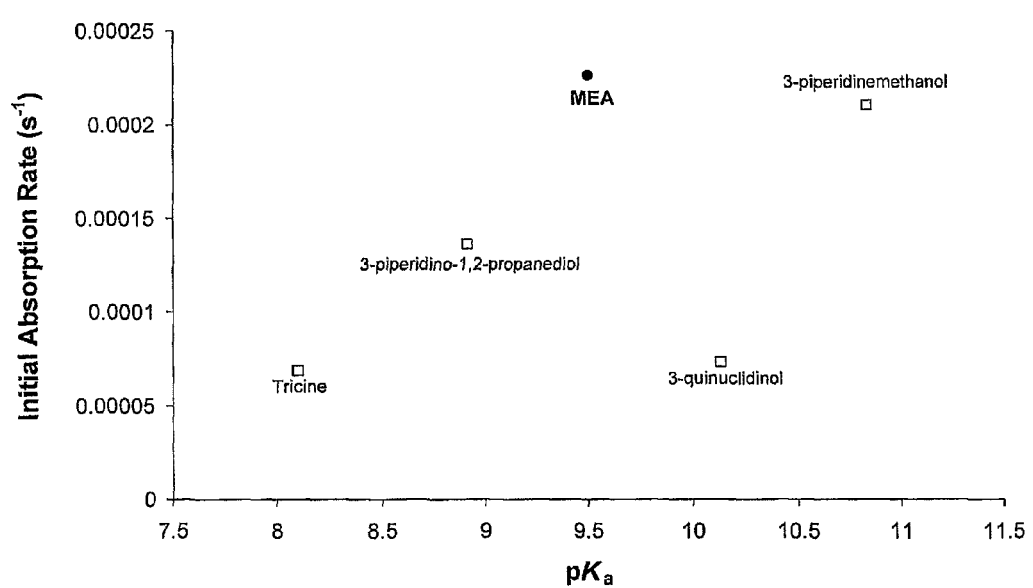
FIG. 3 shows the initial absorption rate of $CO_2$ versus amine $pK_a$ for the specified amines and MEA.

Data is presented in FIG. 3. The secondary amines described have an initial absorption rate at most 40% smaller than MEA (except for Tricine which has the smallest rate). The tertiary amines have initial absorption rates up to 70% smaller than MEA.

EXAMPLE 3 AND COMPARATIVE EXAMPLE C-3

Figure 4:
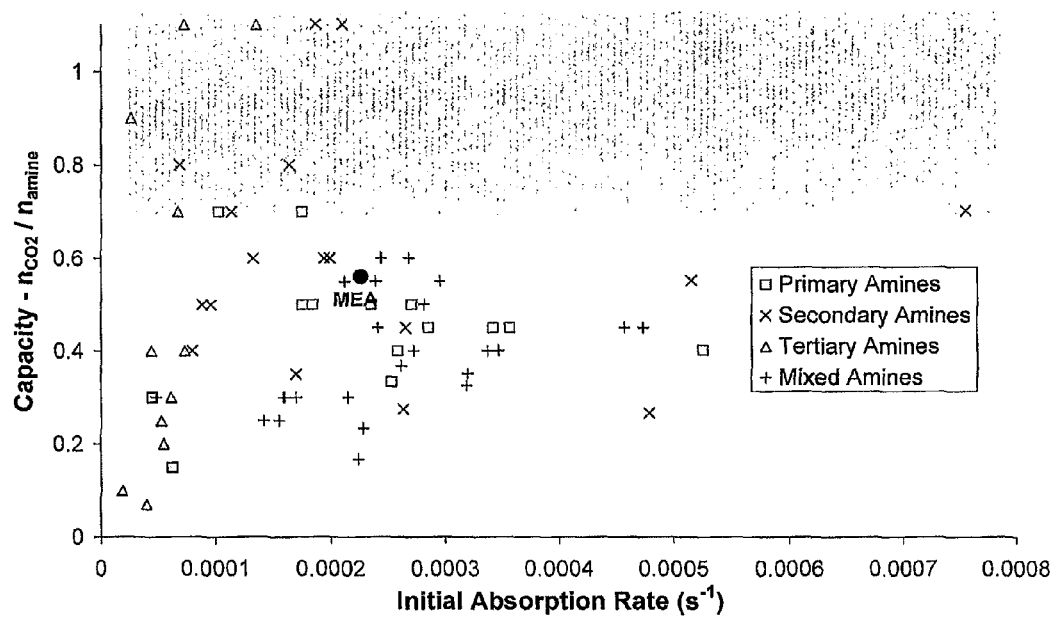
FIG. 4 shows a plot of the absorption capacity versus initial absorption rate for tested amines.

FIG. 4 shows a plot of the absorption capacity versus initial absorption rate for all amines tested for which reliable results were obtained. The area shaded in grey represents the area of the graph covering amines with a molar absorption capacity of 0.7 or above. The capacity of the remaining amines in the shaded area is above 0.7 and the initial absorption rates are above 7×10$^{-5}$ s$^{-1}$. However, their capacities generally fall into the region that would be theoretically predicted based on their $pK_a$. It can be seen from FIG. 4 that the aqueous solutions of the alkanolamines that represent one embodiment of the current invention possess a desirable combination of both a high molar absorption capacity and an acceptable initial rate of $CO_2$ absorption.

EXAMPLE 4 AND COMPARATIVE EXAMPLE C-4

The $CO_2$ molar absorption capacity of several alkanolamines were tested at different partial pressures of $CO_2$. The amines tested were: 2-amino-2-methyl-1,3-propanediol (AMPD)—a sterically hindered primary alkanolamine; 3-piperidinemethanol—a heterocyclic secondary alkanolamine; N,N-dimethylethanolamine—a short chain tertiary alkanolamine; and MEA.

An apparatus was developed using a stirred glass batch reactor to measure vapour liquid equilibria (VLE) data at a range of temperatures and pressures. The apparatus consisted of a 160 mL stirred and jacketed glass reactor vessel coupled to a temperature control and gas delivery system.

For three amines in addition to MEA, the $CO_2$ absorption capacity data was collected at 40° C. over the pressure range ~0.3 to 900 kPa for 1 M aqueous solutions. The method was validated by comparing measurements of $CO_2$ absorption by water to literature data and titration of amine samples to determine $CO_2$ loading.

The following procedure was used for the experiments:

The reactor was charged with 150 mL of aqueous amine solution and brought to constant temperature at 40° C.

Following degassing, $CO_2$ was introduced into the reactor from a high pressure gas reservoir. $CO_2$ was added until equilibrium was reached.

The amount of gas having entered the reactor was determined by mass loss from the high pressure reservoir. The amount of gas in the head space was calculated using a virial equation of state, with the remainder of the gas assumed to be in solution.

Figure 5:
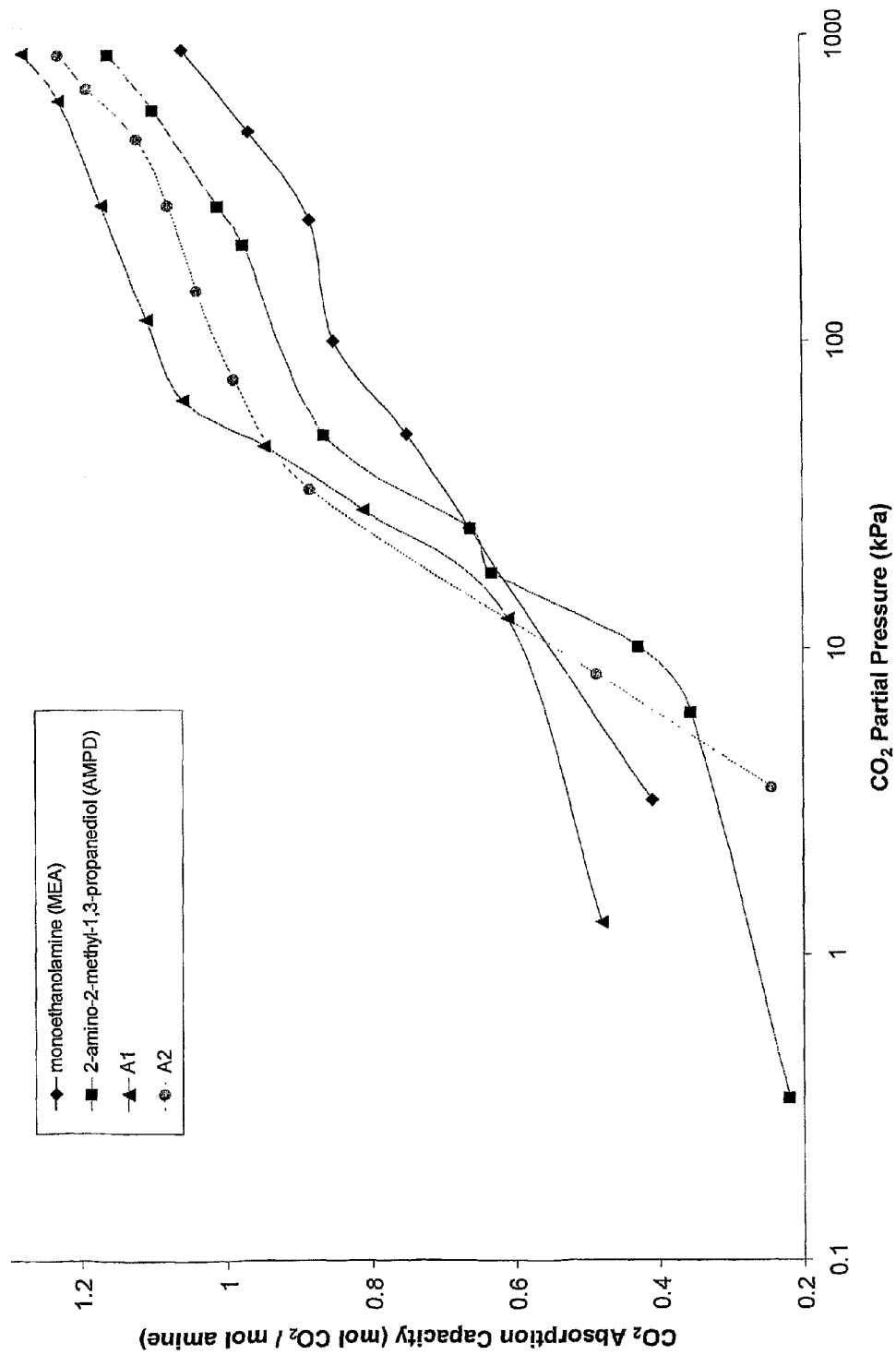
FIG. 5 shows a plot of the absorption capacity for absorption capacity versus the $CO_2$ partial pressure for monoethanolamine (♦), 2-amino-2-methyl-1,3-propanediol (■), 3-piperidinemethanol (A1; ▲) and N,N-dimethylethanolamine (A2; ●)

The virial equation of state used to calculate the amount of gas in the head space is described below:

$$PV = znRT$$

where:
$z = 1 + B/V_m$;
$B = 137.6 - 87.7e^{325.7/T}$;
$V_m = n/V$;
P=absolute pressure;
V=volume; and
n=moles Results of this experiment are presented in FIG. 5.

Over the entire pressure range 3-piperidinemethanol maintains a larger loading than MEA and an equivalent or larger loading than all the other amines. Over the pressure range 1 to 10 kPa MEA has a larger loading than AMPD and N,N-dimethylethanolamine. Above 10 kPa, N,N-dimethylethanolamine has a larger loading than MEA and AMPD. MEA and AMPD are similar between 15 to 25 kPa.

AMPD, 3-piperidinemethanol and N,N-dimethylethanolamine all show a larger absorption capacity than MEA over the range 25 to 900 kPa. Above 100 kPa the absorption that occurs is attributable to increased $CO_2$ solubility in water as a function of increasing pressure.

The reason for 3-piperidinemethanol's larger capacity is likely due to its basicity being greater, in combination with it being a secondary amine and less likely than MEA to form a carbamate. MEA's large capacity at low partial pressure is likely due to its preference to rapidly form a stable carbamate. It takes a higher $CO_2$ partial pressure, and thus larger dissolved $CO_2$ concentration, to push the $CO_2$-MEA-$H_2O$ system to form bicarbonate, but at higher $CO_2$ partial pressures little free MEA remains. The other amines, being likely to favour bicarbonate formation, continue to absorb $CO_2$ as the pressure increases.

It will be understood that the invention disclosed and defined in this specification extends to all alternative combinations of two or more of the individual features mentioned or evident from the text or drawings. All of these different combinations constitute various alternative aspects of the invention.

As used herein, except where the context requires otherwise, the term "comprises" (and its grammatical variants) are not intended to exclude further additives, components, integers or steps.

Reference to any prior art in the specification is not, and should not be taken as, an acknowledgment or any form of suggestion that this prior art forms part of the common general knowledge in Australia or any other jurisdiction or that this prior art could reasonably be expected to be ascertained, understood and regarded as relevant by a person skilled in the art.

The invention claimed is:

1. A process for the capture of CO2 from gas streams comprising contacting a CO2 containing gas stream with an aqueous alkanolamine solution, wherein the alkanolamine is selected from the group consisting of: 3-piperidinemethanol, Tricine, 3-quinuclidinol, 3-piperidino-1,2-propanediol and their salts.

2. A process according to claim 1, wherein the aikanolamine is 3-piperidinemethanol.

3. A process according to claim 1, wherein the alkanolamine is Tricine.

4. A process according to claim 1, wherein the alkanolamine is 3-quinuclidinol.

5. A process according to claim 1, wherein the alkanolamine is 3-piperidino-1,2-propanediol.

* * * * *